(12) United States Patent
Chardon et al.

(10) Patent No.: US 9,116,728 B2
(45) Date of Patent: Aug. 25, 2015

(54) PROVIDING A PERSONA-BASED APPLICATION EXPERIENCE

(75) Inventors: Alvin Chardon, Worcester, MA (US); Kristofer Hellick Reierson, Acton, MA (US); Angela Mele Anderson, Boston, MA (US); Galen Clyde Hunt, Bellevue, WA (US); Douglas Christopher Burger, Redmond, WA (US); Dilip Krishna Pai, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 12/973,939

(22) Filed: Dec. 21, 2010

(65) Prior Publication Data
US 2012/0159479 A1    Jun. 21, 2012

(51) Int. Cl.
*G06F 9/455*    (2006.01)
*G06F 15/16*    (2006.01)
*G06F 9/445*    (2006.01)

(52) U.S. Cl.
CPC ........ *G06F 9/45504* (2013.01); *G06F 9/44505* (2013.01); *G06F 9/45558* (2013.01)

(58) Field of Classification Search
None
See application file for complete search history.

(56) References Cited

U.S. PATENT DOCUMENTS

| | | | |
|---|---|---|---|
| 6,763,370 B1 | 7/2004 | Schmeidler et al. | |
| 6,938,096 B1 | 8/2005 | Greschler et al. | |
| 7,017,188 B1 | 3/2006 | Schmeidler et al. | |
| 7,028,305 B2 | 4/2006 | Schaefer | |
| 7,200,632 B1 | 4/2007 | Greschler et al. | |
| 7,225,264 B2 | 5/2007 | Croman et al. | |
| 7,426,661 B2 | 9/2008 | Schaefer | |
| 7,437,677 B1 | 10/2008 | Capps et al. | |
| 7,451,451 B2 | 11/2008 | Schaefer | |
| 7,523,070 B2 | 4/2009 | McKegney et al. | |
| 7,590,743 B2 | 9/2009 | Willis | |
| 7,690,039 B2 | 3/2010 | Schmeidler et al. | |
| 7,707,641 B2 | 4/2010 | Schmeidler et al. | |
| 7,730,169 B1 | 6/2010 | Greschler et al. | |
| 7,797,372 B2 | 9/2010 | Greschler et al. | |
| 8,078,713 B1 * | 12/2011 | Kim | 709/223 |

(Continued)

FOREIGN PATENT DOCUMENTS

| | | |
|---|---|---|
| CN | 1744100 A | 3/2006 |
| CN | 101194464 A | 6/2008 |

(Continued)

OTHER PUBLICATIONS

"VMware View-Point Blog", Retrieved at <<>>, Aug. 31, 2010, pp. 19.

(Continued)

*Primary Examiner* — Adam Lee
(74) *Attorney, Agent, or Firm* — Nicholas Chen; Kate Drakos; Micky Minhas (57) ABSTRACT

Technologies are described herein for providing; a persona-based application experience. A query for a location of a persona package is received from a virtualization client. When the query is received, a current persona of a user requesting execution of a virtualized application is determined. The location of the persona package corresponding to the current persona of the user is determined. The location of the persona package is sent to the virtualization client in response to the query. The virtualization client is configured to execute the virtualized application adapted to the persona package.

31 Claims, 3 Drawing Sheets

(56) References Cited

U.S. PATENT DOCUMENTS

| | | | |
|---|---|---|---|
| 8,489,872 B1* | 7/2013 | Kapoor | 713/100 |
| 8,494,964 B1* | 7/2013 | Sanderson | 705/51 |
| 2004/0179669 A1* | 9/2004 | Gilbert et al. | 379/221.15 |
| 2005/0091072 A1* | 4/2005 | Dunn et al. | 705/1 |
| 2007/0124336 A1* | 5/2007 | Arellano | 707/104.1 |
| 2007/0124541 A1* | 5/2007 | Lang et al. | 711/137 |
| 2008/0195711 A1* | 8/2008 | Morton et al. | 709/206 |
| 2008/0215867 A1 | 9/2008 | Mackin et al. | |
| 2008/0306956 A1* | 12/2008 | Werthessen et al. | 707/9 |
| 2009/0024992 A1* | 1/2009 | Kulaga et al. | 717/177 |
| 2009/0070431 A1* | 3/2009 | Malik et al. | 709/206 |
| 2009/0119588 A1* | 5/2009 | Moore | 715/706 |
| 2009/0183182 A1 | 7/2009 | Parthasarathy et al. | |
| 2009/0199175 A1* | 8/2009 | Keller et al. | 717/178 |
| 2009/0249051 A1* | 10/2009 | TeNgaio et al. | 713/1 |
| 2009/0254927 A1* | 10/2009 | Shlomai et al. | 719/329 |
| 2009/0271787 A1* | 10/2009 | Clark | 718/1 |
| 2009/0285393 A1* | 11/2009 | Osthassel | 380/255 |
| 2010/0023495 A1* | 1/2010 | Gupta et al. | 707/4 |
| 2010/0023738 A1 | 1/2010 | Sheehan et al. | |
| 2010/0037206 A1* | 2/2010 | Larimore et al. | 717/109 |
| 2010/0064340 A1 | 3/2010 | McCorkendale et al. | |
| 2010/0210304 A1* | 8/2010 | Huslak | 455/558 |
| 2010/0235830 A1* | 9/2010 | Shukla et al. | 718/1 |
| 2010/0287605 A1* | 11/2010 | Strandell | 726/7 |
| 2010/0306270 A1* | 12/2010 | McDiarmid et al. | 707/796 |
| 2010/0318997 A1* | 12/2010 | Li et al. | 718/104 |
| 2011/0078794 A1* | 3/2011 | Manni et al. | 726/23 |
| 2011/0134765 A1* | 6/2011 | Rector et al. | 370/252 |
| 2011/0185043 A1* | 7/2011 | Zeller et al. | 709/219 |
| 2011/0264657 A1* | 10/2011 | Hoffman et al. | 707/728 |
| 2011/0295928 A1* | 12/2011 | Siegel et al. | 709/203 |
| 2012/0033610 A1* | 2/2012 | Ring et al. | 370/328 |
| 2013/0080927 A1* | 3/2013 | Weaver et al. | 715/758 |

FOREIGN PATENT DOCUMENTS

| | | |
|---|---|---|
| WO | WO2009101014 A1 | 8/2009 |
| WO | WO2010014104 A | 2/2010 |

OTHER PUBLICATIONS

Ward, Keith, "The Next Frontier: Mobile Phone Hypervisions", Retrieved at <<>>, Jan. 1, 2009, pp. 3.

"Application Virtualization with Citrix XenApp and HP Platforms", Retrieved at <<>>, Nov. 2009, pp. 4.

"Ceedo Virtualization Technology Overview", Retrieved at <<>>, Jan. 2010, pp. 17.

International Search Report dated Aug. 9, 2012 in International Application No. PCT/US11/065950.

Chinese Official Action dated Mar. 5, 2014 in Chinese Application No. 201110431012.6.

European Official Action dated Aug. 4, 2014 in European Application No. 11850928.0.

Translated the Chinese Office Action mailed Feb. 11, 2015 for Chinese patent application No. 201110431012.6, a counterpart foreign application of U.S. Appl. No. 12/973,939, 10 pages.

Chinese Official Action dated Oct. 20, 2014 in Chinese Application No. 201110431012.6.

* cited by examiner

PROVIDING A PERSONA-BASED APPLICATION EXPERIENCE

BACKGROUND

Some computing devices are mobile devices capable of being utilized for multiple purposes and at a variety of locations. For example, an employee may carry a laptop computer. The mobility and flexibility of the laptop computer may allow the employee to perform work-related functions and address personal computing needs at the office, at home, at a coffee shop, and other locations. However, the employee's occupation may require the employee to access business critical data through secure work networks. As a result, an employer may be concerned about the security of such business critical data and work networks.

Conventionally, the employer may assign a work laptop computer to the employee and limit access to the business critical data and the work networks through only the work laptop computer. The employer may also limit access to personal applications that are not related to work. As a result, the employee may be left to carry a separate laptop computer to address personal computing needs. Such a practice of carrying and maintaining multiple computing devices in order to satisfy multiple purposes can be significantly burdensome and costly, especially for users who have multiple devices (e.g., a laptop computer, a smartphone, a tablet computer, etc.).

It is with respect to these considerations and others that the disclosure made herein is presented.

SUMMARY

Technologies are described herein for providing a persona-based application experience. Application virtualization provides the ability to deliver an application with its own set of configurations to a computer without any installation on the computer. The application may run on the computer through a virtual environment having its own virtual file system, configuration files, and the like. In this way, the application can run in isolation from other applications, thereby avoiding application conflicts that exist on traditionally installed software applications.

By leveraging the functionality of application virtualization, the virtualized application can be adapted with an appropriate persona package selected from multiple persona packages. The persona packages may include persona-specific user settings, persona-specific application storage settings, and persona-specific application state settings. The appropriate persona package may be selected based on a current persona of a user requesting execution of the virtualized application. By adapting the virtualized application with the selected persona package, the virtualized application can be customized according to the current persona of the user. For example, a user's personas may include a work persona, community activist persona, a student persona, a home persona, or the like.

In some example technologies, a computer having a memory and a processor is configured to provide a persona-based application experience. The computer receives a query for a location of a persona package from a virtualization client. Upon receiving the query, the computer determines a current persona of a user requesting execution of a virtualized application. The computer determines the location of the persona package corresponding to the current persona of the user. The computer transmits the location of the persona package to the virtualization client in response to the query. The virtualization client may be configured to execute the virtualized application adapted to the persona package.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a persona-based application experience. A virtualized application may include an application layer and a virtualization layer. The virtualization layer may provide an abstraction of the underlying execution environment. The virtualization layer may provide an isolated virtual environment in which the application layer operates. The virtual environment may include a virtual file system, a virtual registry, and/or the like.

Through the utilization of the technologies and concepts presented herein, the virtualization layer can be adapted to customize the virtualized application based on an appropriate persona package. When a user requests execution of the virtualized application, the virtualization layer may query a persona provider, which determines the user's current persona from multiple personas. The persona provider may then select a persona configuration corresponding to the present persona.

Upon selecting the persona configuration, the persona provider may retrieve a location of the appropriate persona package from the selected persona configuration. The persona provider may then provide the location of the appropriate persona package to the virtualization layer. The virtualization layer may access the persona package at the location and customize the virtualized application according to the persona package. In this way, the user can be provided with a persona-based application experience. The appropriate persona package may include persona-specific user settings, persona-specific application storage settings, and persona-specific application state settings.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
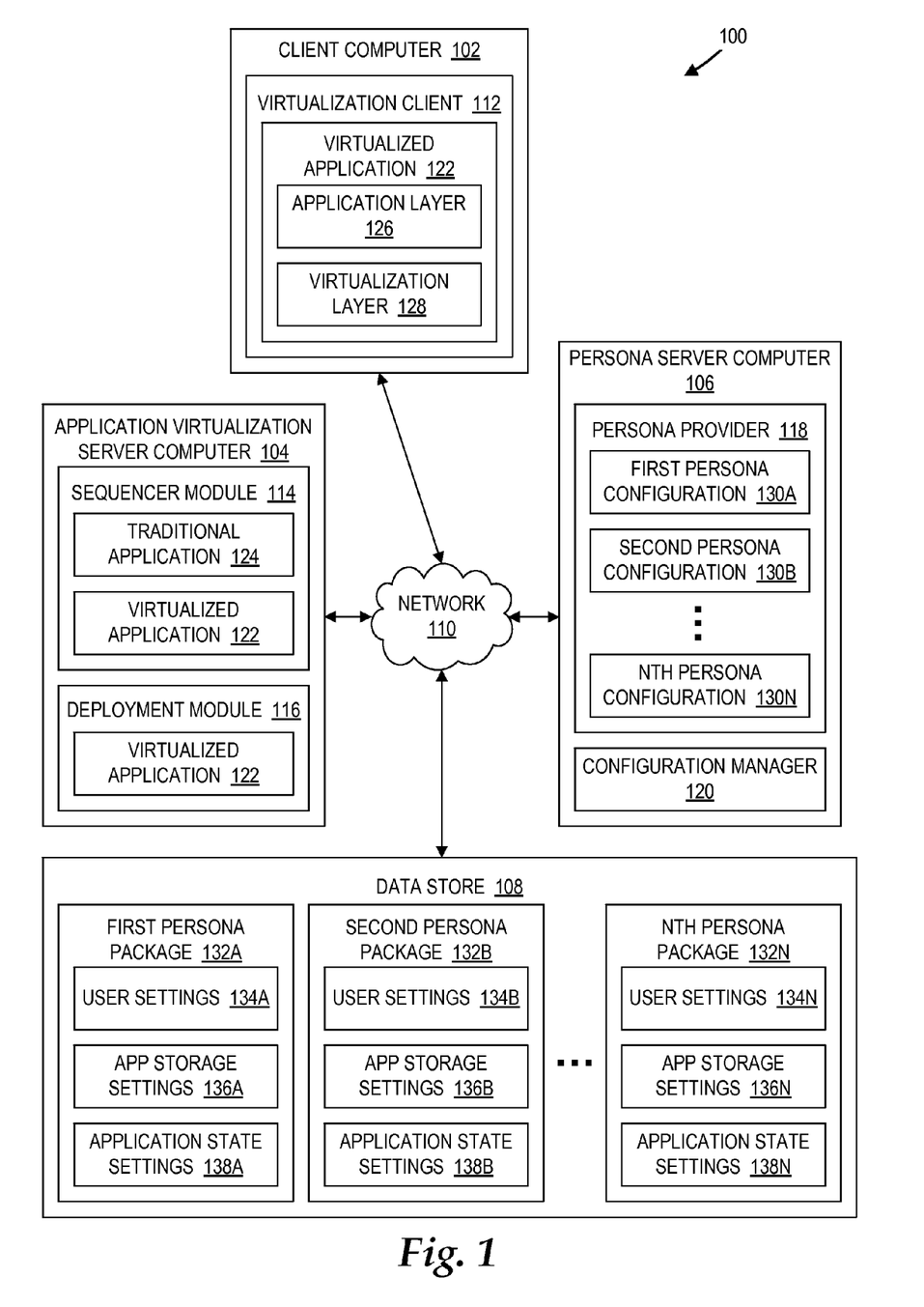
FIG. 1 is a block diagram illustrating a network architecture for providing a persona-based application experience, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing a persona-based application experience will be described. In particular, FIG. 1 illustrates a network architecture 100 for providing a persona-based application experience, in accordance with some embodiments. The network architecture 100 may include a client computer 102, an application virtualization server computer 104, a persona server computer 106, and a data store 108. The client computer 102, the application virtualization server computer 104, the persona server computer 106, and the data store 108 may be coupled via a communications network 110. Some examples of the communications network 110 may include a local area network ("LAN"), a wide area network ("WAN"), and the Internet.

The client computer 102 may include a virtualization client 112. The application virtualization server computer 104 may include a sequencer module 114 and a deployment module 116. The persona server computer 106 may include a persona provider 118 and a configuration manager 120. In other embodiments, one or more components in the persona server computer 106 and/or the data store 108 may be contained locally within the client computer 102.

The client computer 102 may be configured to provide one or more virtualized applications, such as a virtualized application 122. Generally, application virtualization refers to various techniques that make traditionally installed applications available to a client computer without having to install the applications on the client computer. In application virtualization, virtualized applications may be streamed on-demand to the client computer. Each virtualized application may run in its own self-contained virtual environment on the client computer. That is, each virtualized application may be isolated from each other, as well as from the underlying operating system. As a result, application virtualization can reduce application conflicts, centralize and simplify application patching and update, and accelerate the deployment of new applications and updates.

In some illustrative implementations, the sequencer module 114 may virtualize a traditionally installed application (hereinafter "traditional application") 124 into the virtualized application 122. The sequencer module 114 may then provide the virtualized application 122 to the deployment module 116. The deployment module 116 may stream the virtualized application 122 to the client computer 102 on-demand. For example, a user may request execution of the virtualized application 122 by selecting an icon corresponding to the virtualized application 122 on a graphical user interface ("GUI") provided by the client computer 102. The virtualization client 112 may receive the virtualized application 122 for execution by the client computer 102. It should be appreciated that other suitable techniques for generating the virtualized application 122 and/or deploying the virtualized application 122 to the client computer 102 may be contemplated by one skilled in the art.

The virtualized application 122 may include an application layer 126 and a virtualization layer 128. The application layer 126 may contain program code and other suitable data capable of providing various application-related tasks of the virtualized application 122. The virtualization layer 128 may provide and manage the underlying virtual environment in which the client computer 102 executes the application layer 126. For example, the virtual environment may include a virtual file system, a virtual registry, and/or the like.

When establishing the virtual environment, the virtualization layer 128 may query the persona provider 118 for a location of an appropriate persona package associated with the user's current persona. Upon receiving the query, the persona provider 118 may determine the user's current persona and select a persona configuration that corresponds to the user's current persona. The persona provider 118 may include a first persona configuration 130A, a second persona configuration 130B, and an Nth persona configuration 130N. The persona configurations 130A-130N may be collectively referred to as persona configurations 130. In other embodiments, the persona configurations 130A-130N may be stored in a remote data store (not shown) and retrieved by the persona provider 118 over the network 110.

In various embodiments, the persona provider 118 may determine the user's current persona and select the corresponding persona configuration from the persona configurations 130 based on persona identifying information. The persona configurations 130 may be specified by the user, an administrator, and/or by some other personnel through the configuration manager 120. Access to the configuration manager 120 may also be restricted according to some embodiments. For example, the configuration manager 120 may restrict access to only select administrators, thereby allowing an enterprise to prevent employees from modifying the persona configurations 130. Some examples of the persona identifying information may include established credentials of the user, location of the user, time of day, the user's computer network, user gestures, and/or user preference or configuration.

The established credentials may include some form of identification that identifies the user. In this case, the persona provider 118 may select the persona configuration that corresponds to the identified user. The identity of the user may be submitted by the user (e.g. through a username and password) or determined by other suitable means (e.g., a Media Access Control ("MAC") address associated with the client computer 102). In this case, the persona provider 118 may select the persona configuration that corresponds to the identity of the user. The location of the user may refer to the location of the user when the user requests execution of the virtualized application 122. The location of the user may be determined based on Internet Protocol ("IP") address, Global Position System ("GPS") coordinates, or other suitable location determination techniques. In this case, the persona provider 118 may select the persona configuration that corresponds to the location of the user.

The time of day may refer the current time when the user requests execution of the virtualized application 122. In this case, the persona provider 118 may select the persona configuration that corresponds to the time of day. The computer network may refer to the current computer network to which the client computer 102 is connected. The computer network may be determined by the IP address or other suitable network-related information associated with the client computer 102. For example, by identifying the computer network, the persona provider 118 may determine whether the user is at home, work, or some other location. In this case, the persona provider 118 may select the persona configuration that corresponds to the user's computer network.

The user gestures may refer particular user actions. In this case, the persona provider 118 may select or infer the persona configuration based on the user's particular actions. For example, if the user opens a particular document, the persona provider 118 may infer a persona configuration that corresponds to type and/or content of the document. The user preference or configuration may refer to user-defined preferences and/or configurations with respect to the selection of the persona configuration. In this case, the persona provider 118 may select the persona configuration based on the user preference or configuration. For example, the user may associate each persona configuration to various criteria, including those previously described such as location of the user, time of day, the user's computer network, user gestures, and/or the like. Such user preferences may operate separate from or in conjunction with the administrator's configuration.

Each of the persona configurations 130 may contain a location of a corresponding persona package in the data store 108. The data store 108 may be a database or other suitable data storage mechanism. The data store 108 may include a first persona package 132A, a second persona package 132B, and an Nth persona package 132N. For example, the first persona package 132A may correspond to the first persona configuration 130A. The second persona package 132B may correspond to the second persona configuration 130B. The Nth persona package 132N may correspond to the Nth persona configuration 130N. The persona packages 132A-132N may be collectively referred to as persona packages 132. When the persona provider 118 determines the user's current persona and selects the persona configuration based on persona identifying information, the persona provider 118 may retrieve the location of the corresponding persona package from the selected persona configuration. The persona provider 118 may then provide the location of the persona package to the virtualization layer 128 in response to the query.

Upon receiving the location of the persona package, the virtualization layer 128 may access the persona package at the location from the data store 108. The virtualization layer 128 may then adapt execution of the virtualized application 122 according to the persona package, thereby providing a persona-based application experience to the user. In particular, the virtualization layer 128 may access user settings, application storage, and application state contained in the persona package. For example, the first persona package 132A may include associated user settings 134A, application storage settings 136A, and application state settings 138A that are specific to the first persona package 132A. The second persona package 132B may include associated user settings 1344, application storage settings 136B, and application state settings 138B that are specific to the second persona package 132B. The Nth persona package 132N may include associated user settings 134N, application storage settings 136N, and application state settings 138N that are specific to the Nth persona package 132N. The user settings 134A-134N may be collectively referred to as user settings 134. The application storage settings 136A-136N may be collectively referred to as application storage settings 136. The application state settings 138A-138N may be collectively referred to as application state settings 138.

The user settings 134 may define user-specified settings of the virtualized application 122. In one example, the user may customize the GUI of the virtualized application 122 by selecting a certain theme, certain icons, and certain toolbars. In another example, the user may customize the security settings of the virtualized application 122. The application storage settings 136 may define a location of local and/or remote application storage from where application data can be retrieved and to where application data can be stored. For example, if the virtualized application 122 is a word processing application, the application storage may store documents created through the virtualized application 122. The application state settings 138 may define the most recent state of the virtualized application 122 before the virtualized application 122 was closed. For example, if the virtualized application 122 is a word processing application, the application state may include a list of recent documents accessed by the virtualized application 122 and list of recent symbols inserted into in the documents.

Figure 2:
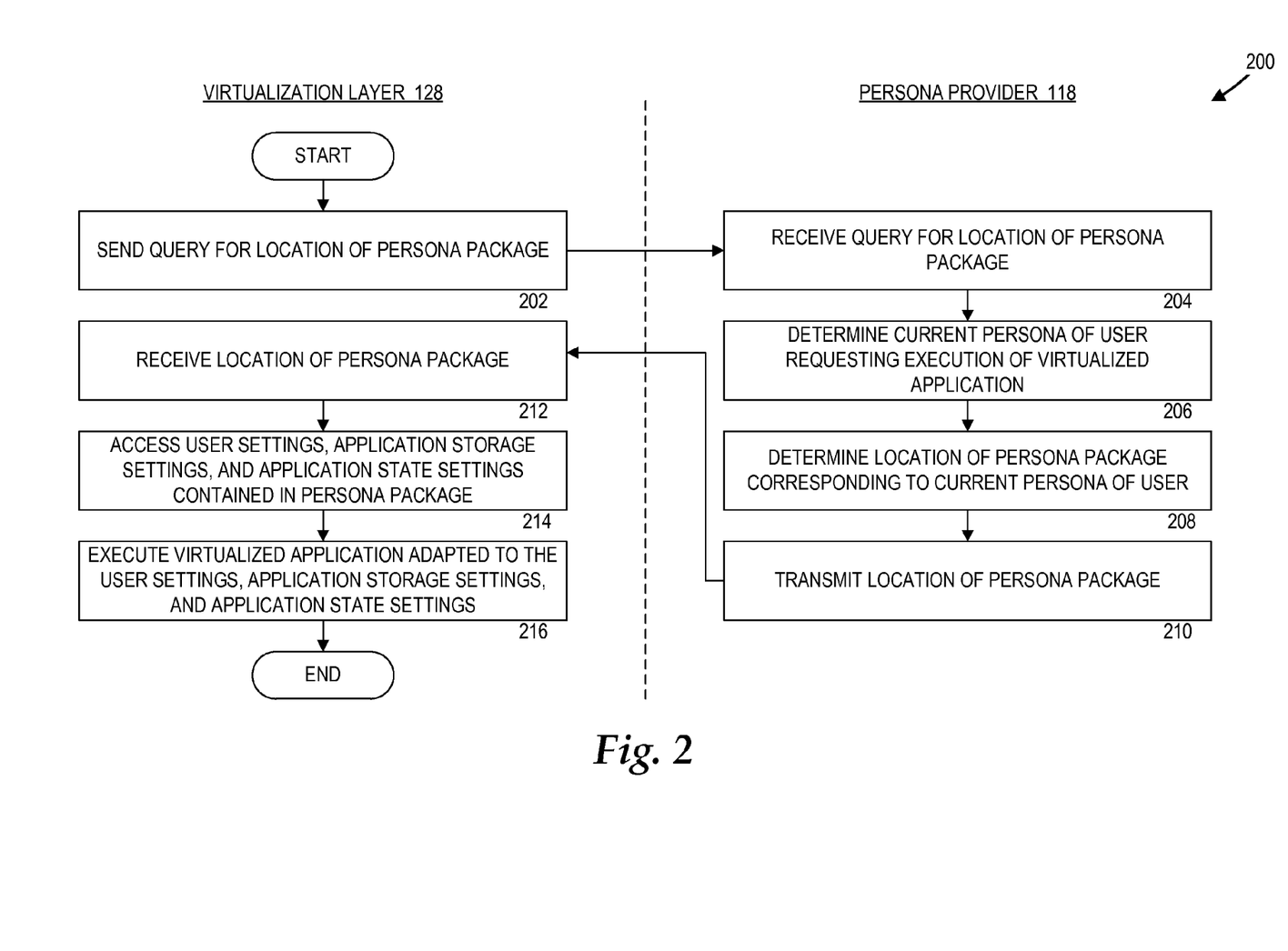
FIG. 2 is a flow diagram illustrating a method for providing a persona-based application experience, in accordance with some embodiments.

Referring now to FIG. 2, additional details regarding the operation of the virtualization client 112 and the persona provider 118. In particular, FIG. 2 is a flow diagram illustrating a method for providing a persona-based application experience, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the virtualization layer 128 sends a query for an appropriate persona package to the persona provider 118. The virtualization layer 128 may send the query when a user requests execution of the virtualized application 122. The routine 200 then proceeds to operation 204, where the persona provider 118 receives the query for the appropriate persona package from the virtualization layer 128. When the persona provider 118 receives the query for the appropriate persona package from the virtualization layer 128, the routine 200 proceeds to operation 206.

At operation 206, the persona provider 118 determines a current persona of the user requesting execution of the virtualized application 122. The persona provider 118 may determine the current persona of the user based on suitable persona identifying information. Some examples of persona identifying information may include may include established credentials of the user, location of the user, time of day, the user's computer network, user gestures, and/or user preferences or user configuration. When the persona provider determines the current persona of the user requesting execution of the virtualized application 122, the routine 200 proceeds to operation 208.

At operation 208, the persona provider 118 determines the location of the appropriate persona package. The persona provider 118 may identify a persona configuration from the multiple persona configurations 130 corresponding to the user's current persona. In an illustrative example, the persona provider 118 may identify that the first persona configuration 130A corresponds to the user's current persona. The persona provider 118 may then retrieve the location of the first persona package 132A which is contained in the first persona configuration 130A. When the persona provider 118 determines the location of the appropriate persona package, the routine 200 proceeds to operation 210.

At operation 210, the persona provider 118 transmits the location of the appropriate persona package to the virtualization layer 128 in response to the query. In the illustrative example, the persona provider 118 may transmit the location of the first persona package 132A to the virtualization layer 128. The routine 200 then proceeds to operation 212, where the virtualization layer 128 receives the location of the appropriate persona package. When the virtualization layer 128 receives the location of the appropriate persona package, the routine 200 proceeds to operation 214.

At operation 214, the virtualization layer 128 accesses the persona package at the location in the data store 108. In particular, the virtualization layer 128 may access user settings, application storage settings, and application state settings contained in the appropriate persona package. In the illustrative example, the virtualization layer 128 may access the user settings 134A, the application storage settings 136A, and the application state settings 138A contained in the first persona package 132A. When the virtualization layer 128 accesses the persona package at the location in the data store 108, the routine 200 proceeds to operation 218.

At operation 218, the virtualization layer 128 executes the virtualized application 122 adapted to the accessed user settings, application storage settings, and application state settings. In the illustrative example, the virtualization layer 128 may execute the virtualization application 122 adapted to the user settings 134A, the application storage settings 136A, and the application state settings 138A. In this way, execution of the virtualized application 122 can be customized according to the user's current persona. When the virtualization layer 128 executes the virtualized application 122 adapted to the accessed user settings, application storage settings, and application state settings, the routine 200 may either repeat (e.g., periodically, continuously, or on demand as needed) or terminate.

Figure 3:
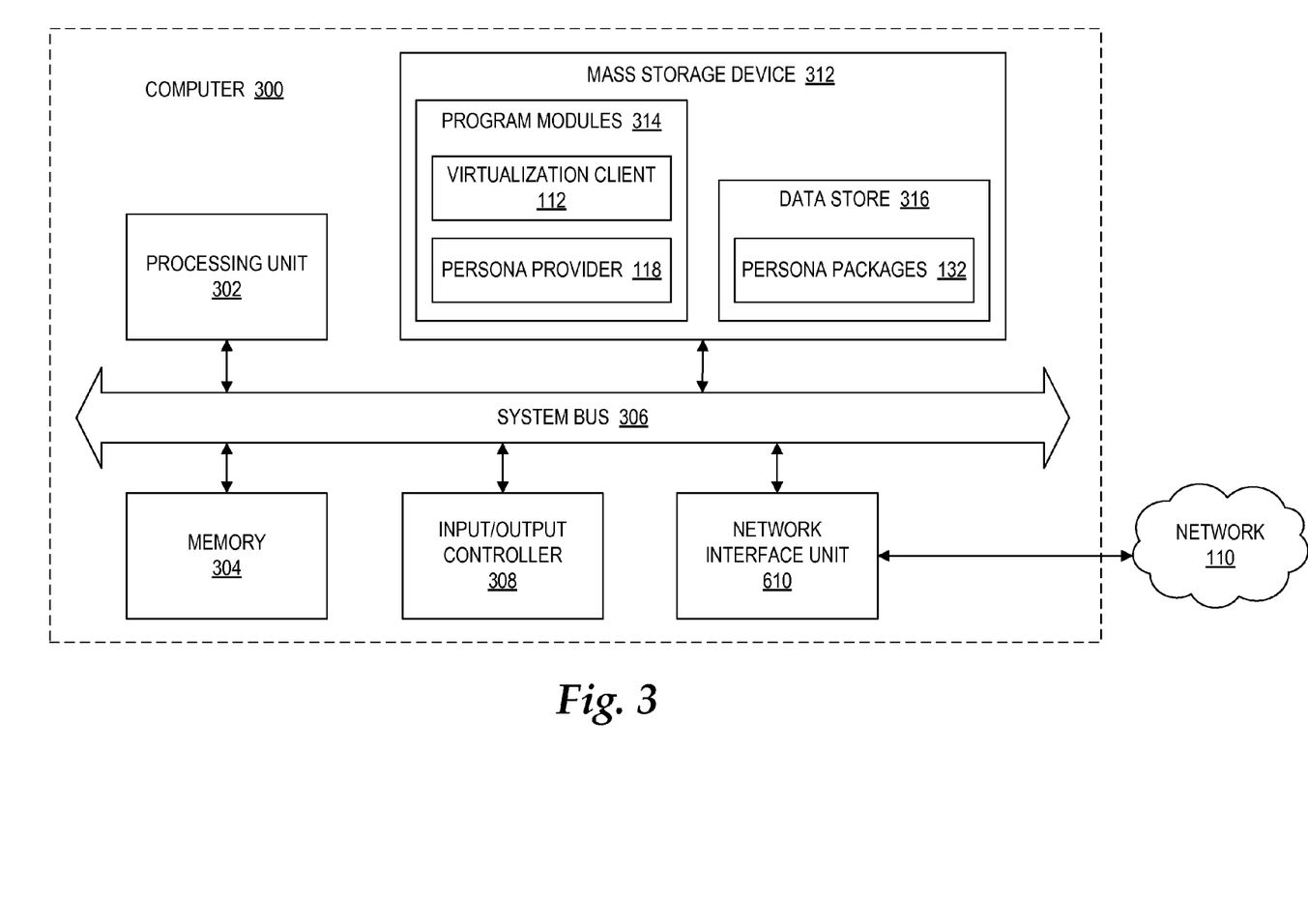
FIG. 3 is a computer architecture diagram showing an illustrative computer hardware architecture for a computing system capable of implementing the embodiments presented herein.

Turning now to FIG. 3, an example computer architecture diagram showing a computer 300 is illustrated. Examples of the computer 300 may include the client computer 102, the application virtualization server computer 104, and the persona server computer 106. The computer 300 may include a central processing unit 302, a system memory 304, and a system bus 306 that couples the memory 304 to the 302. The computer 300 may further include a mass storage device 312 for storing one or more program modules 314 and a data store 316. Examples of the program modules 314 may include the virtualization client 112, the sequencer module 114, the deployment module 116, the persona provider 118, and the configuration manager 120. An example of the data store 316 may include the data store 108. The mass storage device 312 may be connected to the processing unit 302 through a mass storage controller (not shown) connected to the bus 306. The mass storage device 312 and its associated computer-storage media may provide non-volatile storage for the computer 300. Although the description of computer-storage media contained herein refers to a mass storage device, such as a hard disk or CD-ROM drive, it should be appreciated by those skilled in the art that computer-storage media can be any available computer storage media that can be accessed by the computer 300.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network, such as the network 110. The computer 300 may connect to the network 110 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

The bus 306 may enable the processing unit 302 to read code and/or data to/from the mass storage device 312 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 314 may include software instructions that, when loaded into the processing unit 302 and executed, cause the computer 300 to provide a persona-based application experience. The program modules 314 may also provide various tools or techniques by which the computer 300 may participate within the overall systems or operating environments using the components, flows, and data structures discussed throughout this description. For example, the program modules 314 may implement interfaces for providing a persona-based application experience.

In general, the program modules 314 may, when loaded into the processing unit 302 and executed, transform the processing unit 302 and the overall computer 300 from a general-purpose computing system into a special-purpose computing system customized to provide a persona-based application experience. The processing unit 302 may be constructed from any number of transistors or other discrete circuit elements, which may individually or collectively assume any number of states. More specifically, the processing unit 302 may operate as a finite-state machine, in response to executable instructions contained within the program modules 314. These computer-executable instructions may transform the processing unit 302 by specifying how the processing unit 302 transitions between states, thereby transforming the transistors or other discrete hardware elements constituting the processing unit 302.

Encoding the program modules 314 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 314 may transform the physical state of the semiconductor memory, when the software is encoded therein. For example, the program modules 314 may transform the state of transistors, capacitors, or other discrete circuit elements constituting the semiconductor memory.

As another example, the computer-storage media may be implemented using magnetic or optical technology. In such implementations, the program modules 314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing a persona-based application experience are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a persona-based application experience, the method comprising computer-implemented operations for:
   receiving a query for a persona package from a virtualization client executing on a client computer, the persona package comprising a user setting of a virtualized application executing on the virtualization client;
   upon receiving the query, determining a current persona of a user requesting execution of the virtualized application; and
   selecting the persona package based on the current persona of the user and a time of day when the user requests execution of the virtualized application to adapt the execution of the virtualized application according to the selected persona package.

2. The computer-implemented method of claim 1, wherein selecting a persona package further comprises selecting the persona package based on established credentials associated with the user.

3. The computer-implemented method of claim 1, wherein selecting a persona package further comprises selecting the persona package based on a current location of the user.

4. The computer-implemented method of claim 1, wherein selecting a persona package further comprises selecting the persona package based on a computer network of the client computer that sent the query.

5. The computer-implemented method of claim 1, wherein selecting a persona package further comprises selecting the persona package based on user preference or configuration.

6. The computer-implemented method of claim 1, wherein selecting a persona package further comprises selecting the persona package based on user gestures.

7. The computer-implemented method of claim 1, wherein selecting a persona package further comprises:
   identifying a persona configuration from a plurality of persona configurations that matches the current persona of the user; and
   retrieving the persona package corresponding to the current persona of the user from the identified persona configuration.

8. The computer-implemented method of claim 7, further comprising providing a configuration manager for generating the plurality of persona configurations; and wherein the user is restricted from accessing the configuration manager.

9. The computer-implemented method of claim 1, wherein the persona package further comprises one or more of application storage settings and application state settings.

10. An optical disk, a magnetic storage device, or a solid state storage device having computer-executable instructions stored thereon which, when executed by a computer, cause the computer to provide a persona-based application experience by:
    sending, through the computer, a query for a persona package to a persona provider located on a network, the persona package corresponding to a current persona of a user requesting execution of a virtualized application executing on the computer and comprising user settings, application storage settings, and application state settings of the virtualized application;
    receiving, through the computer, the location of the persona provider in response to the query;
    retrieving, through the persona provider, the user settings, the application storage settings, and the application state settings;
    accessing, through the computer, the user settings, the application storage settings, and the application state settings at the persona provider; and
    adapting the execution, through the computer, of the virtualized application according to the user settings, the application storage settings, and the application state settings.

11. The optical disk, the magnetic storage device, or the solid state storage device of claim 10, wherein adapting the execution of the virtualized application according to the user settings, the application storage settings, and the application state settings comprises providing, through the computer, a customized graphical user interface adapted to the user settings.

12. The optical disk, the magnetic storage device, or the solid state storage device of claim 10, wherein adapting the execution of the virtualized application according to the user settings, the application storage settings, and the application state settings comprises retrieving, through the computer, application-related data from and storing the application-related data to an application storage defined by the application storage settings.

13. The optical disk, the magnetic storage device, or the solid state storage device of claim 10, wherein adapting the execution of the virtualized application according to the user settings, the application storage settings, and the application state settings comprises configuring, through the computer, the virtualized application in an application state defined by the application state settings.

14. A computer-implemented method for providing a persona-based application experience, the method comprising computer-implemented operations for:
    receiving a query for a persona package from a virtualization client executing on a client computer having a processor and a memory, the persona package comprising a user setting of a virtualized application executing on the virtualization client;
    upon receiving the query, determining a current persona of a user requesting execution of the virtualized application; and
    selecting the persona package based on the current persona of the user and a computer network of the client computer that sent the query to adapt the execution of the virtualized application according to the user setting of the selected persona package.

15. A computer-implemented method for providing a persona-based application experience, the method comprising computer-implemented operations for:
    receiving a query for a persona package from a virtualization client executing on a client computer having a processor and a memory, the persona package comprising a user setting of a virtualized application executing on the virtualization client;
    upon receiving the query, determining a current persona of a user requesting execution of the virtualized application;
    selecting, through the computer, the persona package based on the current persona of the user and user gestures; and
    adapting the execution of the virtualized application according to the user setting of the selected persona package.

16. A computer system, comprising:
    a processor; and
    a memory communicatively coupled to the processor, the memory having computer having computer-executable instructions stored thereon which, when executed by a computer, cause the computer to provide a persona-based application experience by:
    sending, through the computer, a query for a persona package to a persona provider located on a network, the persona package corresponding to a current persona of a user requesting execution of a virtualized application executing on the computer and comprising user settings, application storage settings, and application state settings of the virtualized application;
    receiving, through the computer, the location of the persona provider in response to the query;
    retrieving, through the persona provider, the user settings, the application storage settings, and the application state settings;
    accessing, through the computer, the user settings, the application storage settings, and the application state settings at the persona provider; and
    adapting the execution, through the computer, of the virtualized application according to the user settings, the application storage settings, and the application state settings.

17. The computer system of claim 16, wherein adapting the execution of the virtualized application according to the user settings, the application storage settings, and the application state settings comprises providing, through the computer, a customized graphical user interface adapted to the user settings.

18. The computer system of claim 16, wherein adapting the execution of the virtualized application according to the user settings, the application storage settings, and the application state settings comprises retrieving, through the computer, application-related data from and storing the application-related data to an application storage defined by the application storage settings.

19. The computer system of claim 16, wherein adapting the execution of the virtualized application according to the user settings, the application storage settings, and the application state settings comprises configuring, through the computer, the virtualized application in an application state defined by the application state settings.

20. A computer system, comprising:
    a processor; and
    a memory communicatively coupled to the processor, the memory having computer-executable instructions stored thereon which, when executed by the processor, cause the processor to
    receive a query for a persona package from a virtualization client executing on a client computer, the persona package comprising a user setting of a virtualized application executing on the virtualization client,
    upon receiving the query, determine a current persona of a user requesting execution of the virtualized application, and
    select the persona package based on the current persona of the user and a time of day when the user requests execution of the virtualized application to adapt the execution of the virtualized application according to the selected persona package.

21. The computer system of claim 20, wherein select the persona package further comprises select the persona package based on established credentials associated with the user.

22. The computer system of claim 20, wherein select a persona package further comprises select the persona package based on a current location of the user.

23. The computer system of claim 20, wherein select a persona package further comprises select the persona package based on a computer network of the client computer that sent the query.

24. The computer system of claim 20, wherein select a persona package further comprises select the persona package based on user preference or configuration.

25. A computer system, comprising:
    a processor; and
    a memory communicatively coupled to the processor, the memory having computer-executable instructions stored thereon which, when executed by the processor, cause the processor to
    receive a query for a persona package from a virtualization client executing on a client computer having a processor and a memory, the persona package comprising a user setting of a virtualized application executing on the virtualization client,
    upon receiving the query, determine a current persona of a user requesting execution of the virtualized application, and
    select the persona package based on the current persona of the user and a computer network of the client computer that sent the query to adapt the execution of the virtualized application according to the user setting of the selected persona package.

26. The computer system of claim 25, wherein select a persona package further comprises select the persona package based on user gestures.

27. The computer system of claim 25, wherein select a persona package further comprises:
   identify a persona configuration from a plurality of persona configurations that matches the current persona of the user; and
   retrieve the persona package corresponding to the current persona of the user from the identified persona configuration.

28. The computer system of claim 25, wherein the memory further comprises computer-executable instructions to provide a configuration manager for generating the plurality of persona configurations, and wherein the user is restricted from accessing the configuration manager.

29. A computer system, comprising:
   a processor; and
   a memory communicatively coupled to the processor, the memory having computer-executable instructions stored thereon which, when executed by the processor, cause the processor to
   receive a query for a persona package from a virtualization client executing on a client computer having a processor and a memory, the persona package comprising a user setting of a virtualized application executing on the virtualization client,
   upon receiving the query, determine a current persona of a user requesting execution of the virtualized application,
   select, through the computer, the persona package based on the current persona of the user and user gestures, and
   adapt the execution of the virtualized application according to the user setting of the selected persona package.

30. The computer system of claim 29, wherein select a persona package further comprises select the persona package based on established credentials associated with the user.

31. The computer system of claim 29, wherein the persona package further comprises one or more of application storage settings and application state settings.

* * * * *